US007930316B2

(12) United States Patent
Muller et al.

(10) Patent No.: US 7,930,316 B2
(45) Date of Patent: Apr. 19, 2011

(54) METHOD, SYSTEM, AND COMPUTER PROGRAM PRODUCT FOR DYNAMIC FIELD-LEVEL ACCESS CONTROL IN SHARED DOCUMENTS

(75) Inventors: Michael Muller, Medford, MA (US); Kushal B. Dave, New York, NY (US); Jonathan Feinberg, Somerville, MA (US); Sandra L. Kogan, Newton, MA (US); Eric Wilcox, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/026,356

(22) Filed: Dec. 30, 2004

(65) Prior Publication Data

US 2006/0149567 A1    Jul. 6, 2006

(51) Int. Cl.
*G06F 17/30* (2006.01)
(52) U.S. Cl. ........ 707/785; 707/661; 707/694; 707/702; 707/736; 707/758; 707/792; 707/783; 707/793; 707/803; 707/805; 707/822; 705/1; 709/204; 709/220; 709/223; 709/225; 709/226; 715/751; 715/733; 715/755; 715/758; 713/176; 713/170; 713/118; 713/141; 713/146
(58) Field of Classification Search ............... 707/10, 707/661, 694, 702, 736, 758, 792, 783, 793, 707/803, 805, 822, 999.102, 999.009; 705/1; 709/204, 220, 223, 225, 226; 715/751, 733, 715/755, 758; 713/176, 170, 118, 141, 146
See application file for complete search history.

(56) References Cited

U.S. PATENT DOCUMENTS

| | | | | |
|---|---|---|---|---|
| 5,890,177 A * | 3/1999 | Moody et al. | ................. | 715/511 |
| 6,009,427 A * | 12/1999 | Wolff | ............................. | 707/10 |
| 6,161,113 A * | 12/2000 | Mora et al. | .................... | 715/505 |
| 6,195,091 B1 * | 2/2001 | Harple et al. | ................. | 715/751 |
| 6,230,171 B1 * | 5/2001 | Pacifici et al. | ................ | 715/512 |
| 6,332,163 B1 * | 12/2001 | Bowman-Amuah | .......... | 709/231 |
| 6,487,605 B1 | 11/2002 | Leung | | |
| 6,609,154 B1 | 8/2003 | Fuh et al. | | |
| 6,636,889 B1 * | 10/2003 | Estrada et al. | ................ | 709/203 |
| 6,651,096 B1 | 11/2003 | Gai et al. | | |
| 6,671,805 B1 * | 12/2003 | Brown et al. | ................. | 713/176 |
| 6,775,668 B1 * | 8/2004 | Goel | ................................ | 707/9 |
| 7,676,542 B2 * | 3/2010 | Moser et al. | ................. | 709/204 |
| 2002/0065919 A1 * | 5/2002 | Taylor et al. | ................. | 709/226 |
| 2005/0005244 A1 * | 1/2005 | Chesley et al. | ............... | 715/751 |

(Continued)

OTHER PUBLICATIONS

Huget, MP et al., "Model Checking for ACL Compliance Verification," International Workshop on Agent Communication Language, ACL 2003. Revised and Invited Papers (Lecture Notes in Artificial Intelligence, vol. 2922), pp. 75-90.

(Continued)

*Primary Examiner* — Syling Yen
(74) *Attorney, Agent, or Firm* — Ayla A. Lari; Hoffman Warnick LLC (57) ABSTRACT

A method, system, and computer program product for dynamic field-level access control in shared documents. The method comprises: providing a field in a shared document, wherein the field is not owned by a user and can be edited by any user; and assigning sole ownership of the field to a user who first edits the field, wherein the owner of the field controls access to the field using at least one access control list.

22 Claims, 9 Drawing Sheets

U.S. PATENT DOCUMENTS

2006/0095443 A1* 5/2006 Kumar et al. .................. 707/100

OTHER PUBLICATIONS

Swift, M. M., et al., "Improving the Granularity of Access Control in Windows NT," Proceedings of the sixth ACM symposium on Access control models and technologies, Chantilly, Virginia, 2001, pp. 87-96.

Swift, M. M., et al., "Improving the Granularity of Access Control for Windows 2000," ACM Transactions on Information and System Security, vol. 5, No. 4, Nov. 2002, pp. 398-437.

Karjoth, G., "Access Control with IBM Tivoli Access Manager," ACM Transactions on Information and System Security, vol. 6, No. 2, May 2003, pp. 232-257.

* cited by examiner

Information Regarding Patents

What Is a Patent?

A patent for an invention is the grant of a property right to the inventor, issued by the United States Patent and Trademark Office. Generally, the term of a new patent is 20 years from the date on which the application for the patent was filed in the United States or, in special cases, from the date an earlier related application was filed, subject to the payment of maintenance fees. U.S. patent grants are effective only within the United States, U.S. territories, and U.S. possessions. Under certain circumstances, patent term extensions or adjustments may be available.

What Type of Protection does a Patent Provide?

The right conferred by the patent grant is, in the language of the statute and of the grant itself, "the right to exclude others from making, using, offering for sale, or selling" the invention in the United States or "importing" the invention into the United States. What is granted is not the right to make, use, offer for sale, sell or import, but the right to exclude others from making, using, offering for sale, selling or importing the invention. Once a patent is issued, the patentee must enforce the patent without aid of the USPTO.

There are three types of patents granted by the USPTO: Utility, Design, and Plant.

METHOD, SYSTEM, AND COMPUTER PROGRAM PRODUCT FOR DYNAMIC FIELD-LEVEL ACCESS CONTROL IN SHARED DOCUMENTS

BACKGROUND OF THE INVENTION

1. Field of the Invention

The present invention relates generally to electronic documents. More specifically, the present invention provides a method, system, and computer program product for dynamic field-level access control in shared documents.

2. Background Art

Many work environments require collaborative writing and editing of shared documents, drawings, presentations, spreadsheets, Web pages, workflows, etc. A good example is a scientific paper, in which researchers need to jointly develop and refine a document. Technology, such as the Internet, has simplified such collaboration, whether the participants are co-located or in different geographic locations, and has changed the way many people work. By giving an almost instantaneous access to information distributed all over the world, the Web lets people who have never met collaborate together.

Collaborative writing/editing is a complex task which can vary along several parameters. Apart from inherent difficulties associated with the writing task itself, collaborative writing/editing introduces all those problems commonly associated with a group of people trying to work together including, for example: division of work, ownership, access control (e.g., read, write, edit), reconciliation of conflicting and/or simultaneous modifications, awareness of tasks (e.g., the current status of the document, access to recent modifications to the document), etc. Accordingly, there is a need to solve these and other problems associated with the prior art.

SUMMARY OF THE INVENTION

In general, the present invention provides a method, system, and computer program product for dynamic field-level access control in shared documents. In particular, the present invention subdivides a shared document, drawing, presentation, spreadsheet, Web page, workflow, etc., hereafter generally referred to as a "shared document," into multiple sections or "fields," each of which is controlled by one user (or by one "role," with one or more users working within each role). Unlike the prior art, which assigns individual fields to individual users using static field-level access control lists (ACLs), the present invention provides for dynamic ACLs for each field. That is, each dynamic-ACL field is initially "owned" by no one until it has been edited (e.g., written on or otherwise changed). After that, it is owned solely by the user that first edited the field.

The shared document is presented to users as a plurality of separate fields. For example, each region of text in a shared text document can be presented to users as a separate field. Initially, any field can be edited by any user, and all contents of a field can be read by any user. When a user is the first to edit a field in a shared document, that user automatically becomes the "owner" of that field—i.e., the access control for that field is assigned to that user. The owning user of that field can then specify using one or more ACLs:

(A) Who can edit the field;
(B) Who can view the field;
(C) Whether code associated with the shared document can access the field; and
(D) Whether other documents, pages, workflows, Real Simple Syndication (RSS) readers, etc., that access the shared document can access the field. The owning user can revisit the field at any time to change the ACLs.

A first aspect of the present invention provides a method for dynamic field-level access control in a shared document, comprising: providing a field in the shared document, wherein the field is not owned by a user and can be edited by any user; and assigning sole ownership of the field to a user who first edits the field, wherein the owner of the field controls access to the field using at least one access control list.

A second aspect of the present invention provides a system for dynamic field-level access control in a shared document, comprising: a system for providing a field in the shared document, wherein the field is not owned by a user and can be edited by any user; and a system for assigning sole ownership of the field to a user who first edits the field, wherein the owner of the field controls access to the field using at least one access control list.

A third aspect of the present invention provides a program product stored on a recordable medium for dynamic field-level access control in a shared document, which when executed comprises: program code for providing a field in the shared document, wherein the field is not owned by a user and can be edited by any user; and program code for assigning sole ownership of the field to a user who first edits the field, wherein the owner of the field controls access to the field using at least one access control list.

A fourth aspect of the present invention includes a method for providing access control in a Wiki, comprising: a user inserting a virtual field comprising text into the Wiki using at least one delimiter; and assigning sole ownership of the virtual field to the user who inserted the virtual field into the Wiki, wherein the owner of the virtual field controls access to the virtual field using at least one access control list.

A fifth aspect of the present invention includes a system for providing access control in a Wiki, comprising: a system for allowing a user to insert a virtual field comprising text into the Wiki using at least one delimiter; and a system for assigning sole ownership of the virtual field to the user who inserted the virtual field into the Wiki, wherein the owner of the virtual field controls access to the field using at least one access control list.

A sixth aspect of the present invention includes a program product stored on a recordable medium for providing access control in a Wiki, comprising: program code for allowing a user to insert a virtual field comprising text into the Wiki using at least one delimiter; and program code for assigning sole ownership of the virtual field to the user who inserted the virtual field into the Wiki, wherein the owner of the virtual field controls access to the virtual field using at least one access control list.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention, and are not necessarily to scale. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for dynamic field-level access control in shared documents. In particular, the present invention subdivides a shared document into multiple sections or "fields," each of which is controlled by one user (or by one "role," with one or more users working within each role). The present invention provides for dynamic ACLs for each field. Initially, each dynamic-ACL field is initially "owned" by no one until it has been edited. After that, it is owned solely by the user (or the role) that first edited the field, i.e., the access control for that field is assigned to that user.

Figure 1:
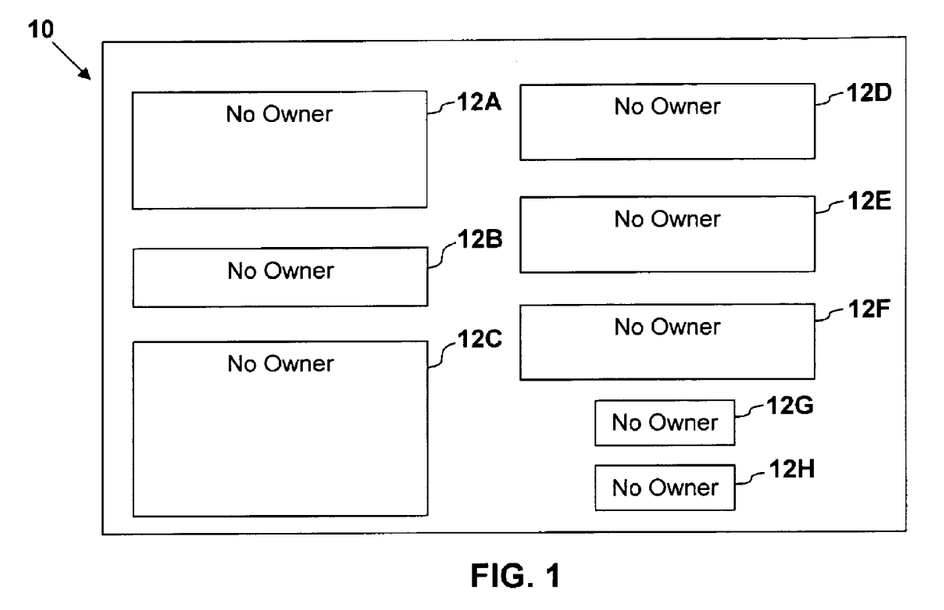
FIG. 1 depicts an illustrative shared document in accordance with an embodiment of the present invention.
Figure 2:
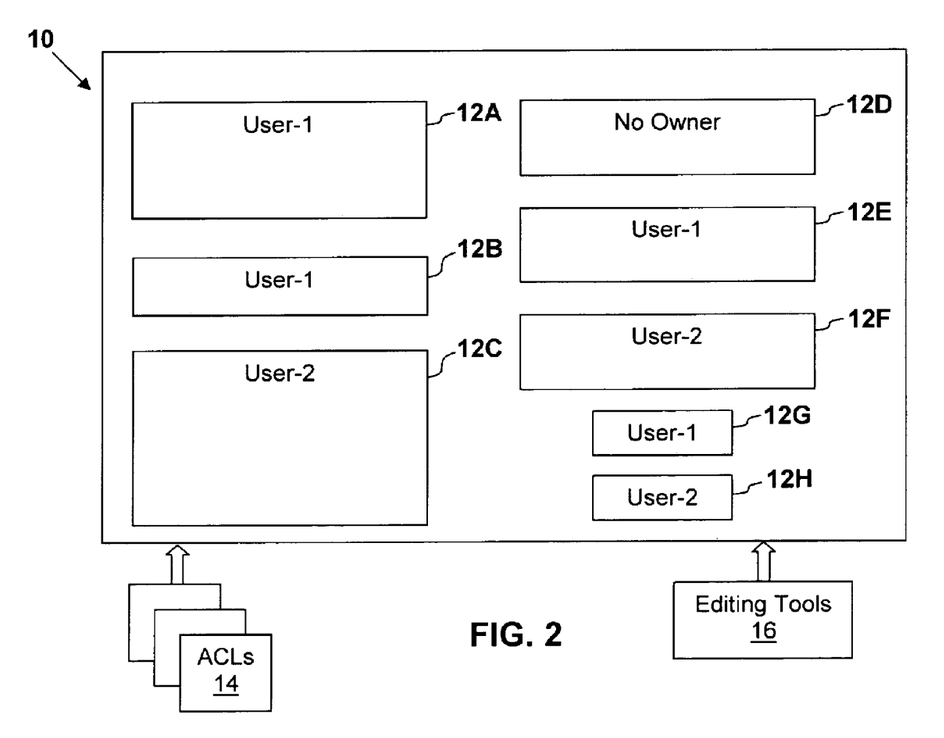
FIG. 2 depicts the ownership of each dynamic-ACL field in the shared document of FIG. 1.

An illustrative shared document 10 in accordance with an embodiment of the present invention is illustrated in FIG. 1. The shared document 10 is presented to users as a plurality of separate, dynamic-ACL fields 12 (e.g., 12A, 12B, . . . , 12H). Initially, each field 12 is owned by no one as indicated by the "No Owner" designation. Once a field 12 has been edited, the user that first edited the field is the sole owner of that field 12. An example of this is illustrated in FIG. 2, where a user "User-1" was the first to edit fields 12A, 12B, 12E, and 12G, and a user "User-2" was the first to edit fields 12C, 12F, and 12H. To this extent, in accordance with the present invention, User-1 is now the owner of fields 12A, 12B, 12E, and 12G, while User-2 is now the owner of fields 12C, 12F, and 12H. Field 12D does not yet have an owner.

As described above, when a user is the first to edit a dynamic-ACL field in a shared document, that user automatically becomes the "owner" of that field—i.e., the access control for that field is assigned to that user. The owning user of that field can then specify in one or more ACLs: who can edit the field; who can view (read) the field; whether code associated with the shared document can access the field; and whether other "entities," such as documents, pages, workflows, RSS readers, etc., that access the shared document, can access the field. Other permissions are also possible. The owning user can revisit the field at any time to change the ACLs. By default, the owning user of a field is assumed to have view and edit permissions for that field. The owning user can change these, if desired. It is assumed that the reader has an understanding of ACLs commensurate with one skilled in the art. Accordingly, a detailed description of ACLs, including how ACLs are populated, generated, used, etc., will not be provided herein.

In general, a shared document is formatted individually (i.e., in a customized manner) for each user. The formatting can involve, for example:

(A) Displaying fields or data (e.g., text) that all users are allowed to see;

(B) Displaying fields or data for which a particular user has view or edit permissions;

(C) Displaying (or making available for query or mouse-over) the identity of other users who own a field or portions of the text; and (D) Providing editing controls to the user, for those fields which the user has edit permission.

Returning to FIG. 2, it is assumed that User-1 has specified via one or more ACLs 14 that User-2 has permission to view field 12A and view/edit field 12E in the shared document 10. User-1 has not given User-2 permission to either view or edit fields 12B and 12G. It is also assumed that User-2 has specified via one or more ACLs 14 that User-1 has permission to view (but not edit) fields 12C and 12H in the shared document 10.

Figure 3:
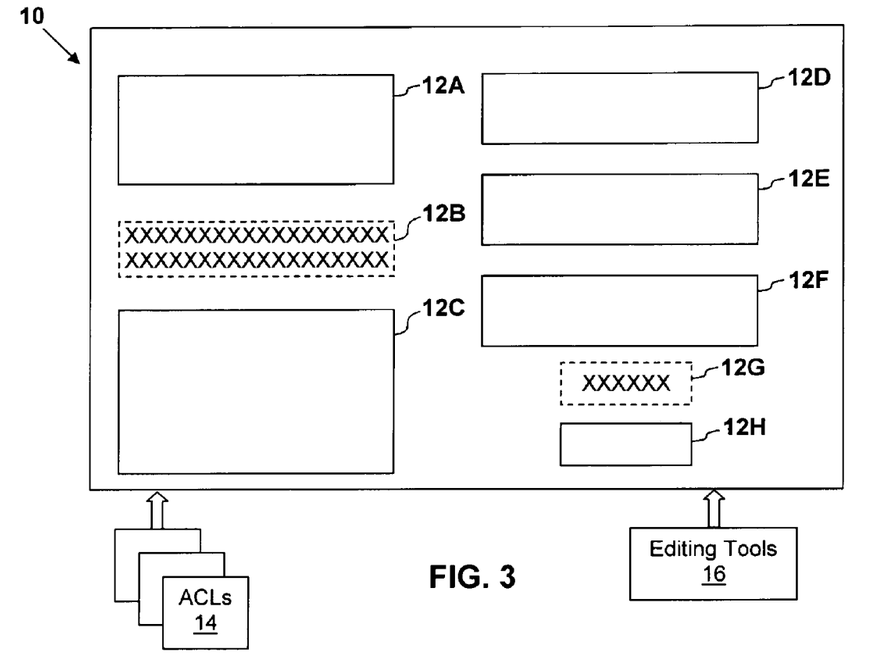
FIGS. 3-4 depict the display of the shared document of FIG. 2 when accessed by two different users.

When User-2 accesses the shared document 10 of FIG. 2, it is displayed, for example, as shown in FIG. 3. Since User-2 does not have view permission for fields 12B and 12G, these fields can be filled with blank or nonsense characters as shown, or they can be blanked out in some manner in the shared document 10 as indicated in phantom. Optionally, these fields may simply be made invisible to users who are not authorized to view them (i.e., the user may not know that the fields exist). In a client-server architecture, the server may be configured such that it sends only the field name but not its contents, or such that it sends neither the field name nor its contents. User-2 can view/edit fields 12C, 12F, and 12H, which are owned by User-2, and can view field 12A and view/edit field 12E, which are owned by User-1. User-2 can also view/edit field 12D, which is not owned by any user. If User-2 is the first to edit field 12D, then field 12D is owned by User-2. Editing tools/controls 16 can be provided for the editing of those fields for which a user has edit permission.

Figure 4:
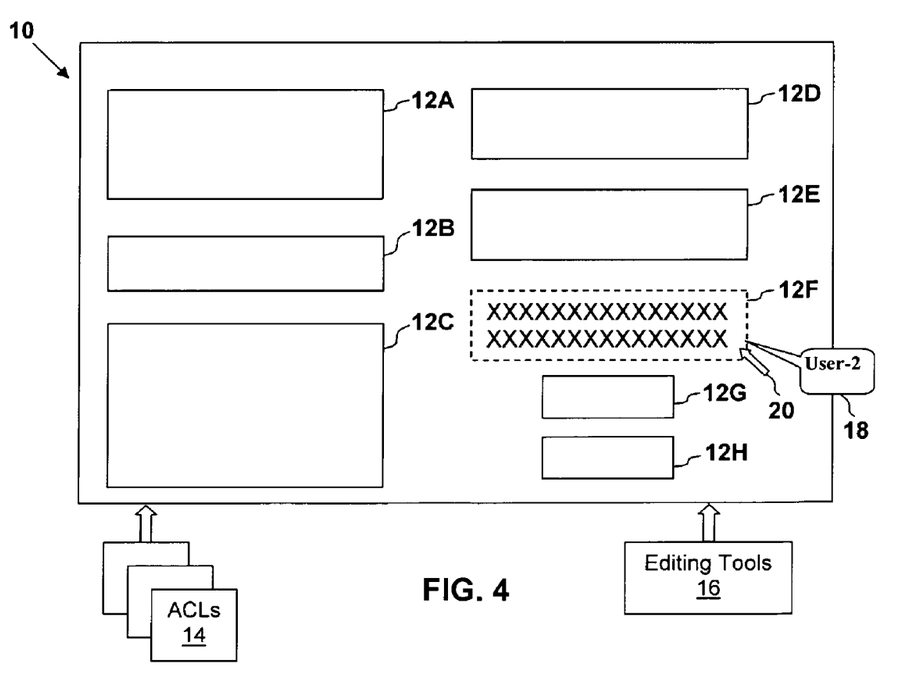

When User-1 accesses the shared document 10 of FIG. 2, it is displayed, for example, as shown in FIG. 4. Since User-1 does not have view permission for field 12F, this field can be filled with blank or nonsense characters as shown, or it can be blanked out in the shared document 10 as indicated in phantom. Again, optionally, these fields may simply be made invisible to users who are not authorized to view them (i.e., the user may not know that the fields exist). User-1 can view/edit fields 12A, 12B, 12E, and 12G, which are owned by User-1, and can view fields 12C and 12H, which are owned by User-2. User-1 can also view/edit field 12D, which is not owned by any user. If User-1 is the first to edit field 12D, then field 12D is owned by User-1.

If desired, information regarding the ownership of a dynamic-ACL field (e.g., field-owner visibility) can be provided (e.g., displayed) to all/selected users, based on ownership view permissions specified in one or more ACLs. For example, a field can be implemented such that the identity of the owning user is made visible to other users (e.g., so that they can query the owning user about the need for constraints on access to the field). An example of this is shown in FIG. 4, where information 18 regarding the ownership of field 12F is provided to another user (e.g., User-1) in response to a mouse-over 20. Many other techniques for providing/displaying ownership information are also possible. In other implementations (e.g., anonymous voting), the identity of the owning user may be made invisible to other users.

The owner of a shared document (e.g., author or manager) can specify whether the shared document can include a fixed or variable number of dynamic-ACL fields. If a variable number of fields are allowed, then the owner of the shared document can allow selected users to insert a new field into the shared document. The new field can be inserted between two existing fields, above the first field, or below the last field.

Figure 5:
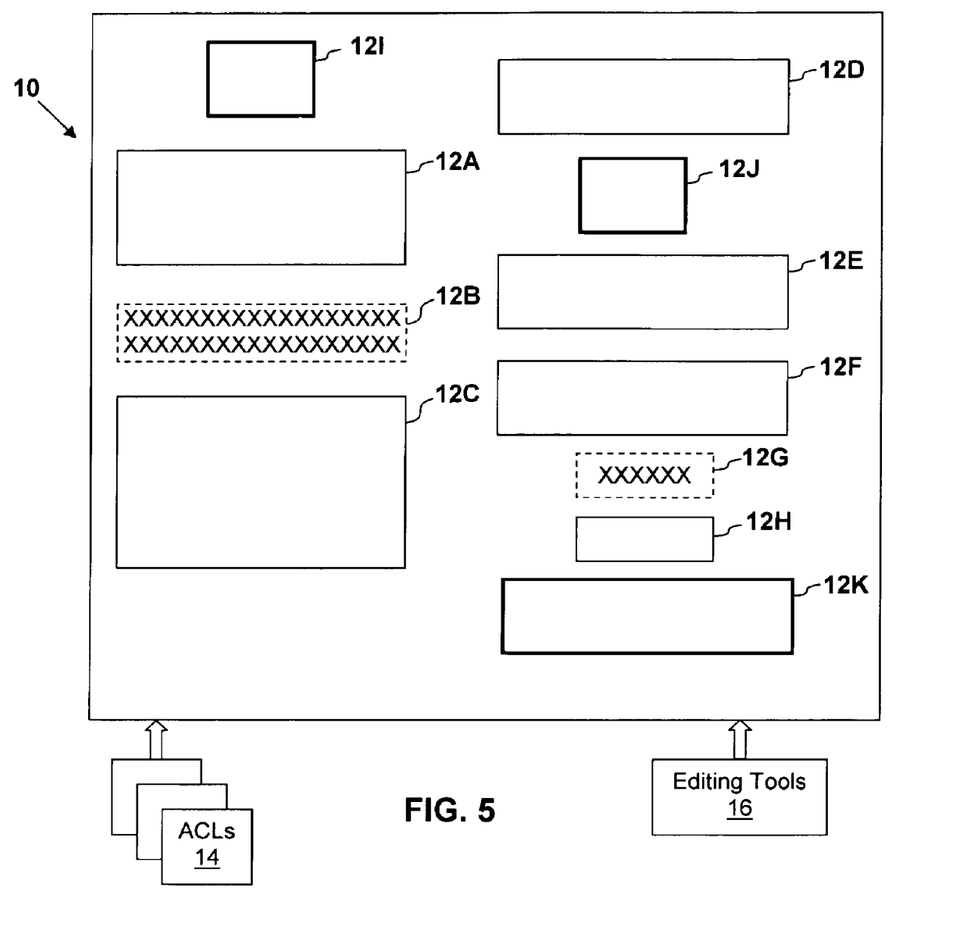
FIG. 5 depicts an example of the insertion of new dynamic-ACL fields by a user into the shared document of FIG. 3.

An example of the insertion of new dynamic-ACL fields 12 by User-2 into the shared document 10 of FIG. 3 is illustrated in FIG. 5. As shown, User-2 has inserted a new field 12I above the first field 12A, a new field 12J between fields 12D and 12E, and a new field 12K below the last field 12H. Since User-2 inserted the new fields 12I, 12J, and 12K into the shared document 10, User-2 is the owner of those new fields and can specify access permissions for the new fields using one or more ACLs.

Concepts similar to those described above apply to the accessing of dynamic-ACL fields by code and/or other entities (e.g., documents, pages, workflows, RSS readers, etc.). For example, a user can specify access permissions using one or more ACLs to selectively control access to the fields by code associated with the shared document and entities that access the shared document.

Figure 6:
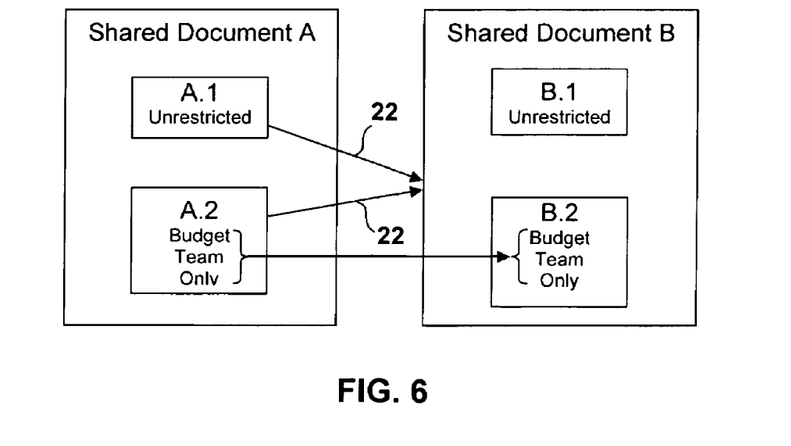
FIG. 6 depicts the cascading of permissions from one shared document to another in accordance with the present invention.

In another embodiment of the present invention, permissions may be cascaded from one shared document to another. For example, as shown in FIG. 6, for two shared documents A and B, assume document A has fields A.1 and A.2, and assume the viewing of field A.1 is unrestricted, but the viewing of field A.2 is restricted to the members of a Budget Team. Shared document B contains code that reads the value of fields A.1 and A.2 as indicated by arrows 22, and presents computations based on those fields in fields B.1 and B.2, respectively. All users of document B may view the contents of field B.1, but only the Budget Team members may view the contents of field B.2, since the restrictions on field B.2 are cascaded automatically from the restrictions on field A.2. The author of document B may impose additional restrictions on who is allowed to view the contents of either field B.1 or field B.2, but the author of document B may not reduce the restrictions that are cascaded from the ACL(s) of field A.2 of document A. Another way to say this is as follows: The contents of a "resulting field" may be calculated on the basis of the contents of one or more "source fields." For any resulting field, the restrictions on that field are the intersection of all of the restrictions of the source fields, plus any additional restrictions that are placed on the ACL(s) of the resulting field.

In some embodiments of the present invention, ownership may be based not on a user's identity, but on a role that is associated with the user. In these embodiments, permissions are assigned to anyone who has that role. Management of roles is not described herein. However, this invention can make use of the services of a role management system, (a) by using roles in place of identities, and (b) by providing, when appropriate, role-based interventions (e.g., the role management system could indicate substitution of one person for another, such as during vacations or illnesses, or could assist with exception-handling by exploiting the structure of an organization chart).

Another embodiment of the present invention uses paragraph delimitations of text. That is, the separate dynamic-ACL fields described above are replaced with paragraphs. Each paragraph has one or more or its own ACLs, but the paragraphs appear (as viewed on the formatted page) as a single block of text. For editing, the user has permissions only on her/his own paragraphs. A user can insert additional paragraphs, similarly to the fixed or variable number of dynamic-ACL fields described above. By default, a user who inserts a paragraph becomes the owner of that paragraph.

In another embodiment of the present invention, dynamic-ACL-type fields can be used in a Wiki-type environment. As known in the art, a Wiki is a website (or other hypertext document collection) that allows a user to create and edit Web page content, but also allows that content to be edited by anyone. During editing, a user types in simple text-formatting mark-ups. When the text is displayed, these mark-ups are used to control presentation of the text (e.g., bold, italics, bullet-list, etc.). Detailed information regarding Wikis can be found, for example, at http://wiki.org/.

For a Wiki-like embodiment of the dynamic-ACL field approach of the present invention, a single body of text is delimited into separate "virtual fields" wherein:
(A) The body of text comprises a sequence of virtual fields.
(B) Each virtual field is owned by one user (or by one role).
(C) There is a character, string, or other type of delimiter that indicates the boundary separating each virtual field from adjacent virtual fields. This delimiter is visible during editing, and may optionally be made visible during displaying.
(D) Delimiters may not be overwritten during editing.
(E) During editing, a user can only edit the contents of the virtual fields owned by the user. Other virtual fields are displayed, in sequence, either with their contents (if the user has view permission for that virtual field) or with blanks or nonsense characters (if the user does not have view permission for that virtual field).
(F) The user may insert a new virtual field in the body of text. By default, the user is the owner of this new virtual field. In one embodiment, a user may only insert a new virtual field at the boundary of another virtual field (i.e., at the beginning or end of the body of text, or between two other virtual fields). In another embodiment, a user may insert a new virtual field anywhere in any virtual field.
(G) A user may specify ACLs for any virtual field owned by the user.
(H) During display, all of the virtual fields are combined in order, and formatted according to Wiki formatting conventions.
(I) In one embodiment, the delimiters are invisible during display of the Wiki, and there is no additional information about who wrote/owns each virtual field. In another embodiment, there is mouse-over information (or similar optional information that may be revealed with modest user effort) about the owner of each virtual field. In yet another embodiment, delimiters are visible, and there is mouse-over information (or similar, per above) about the owner of each virtual field.

Figure 7:
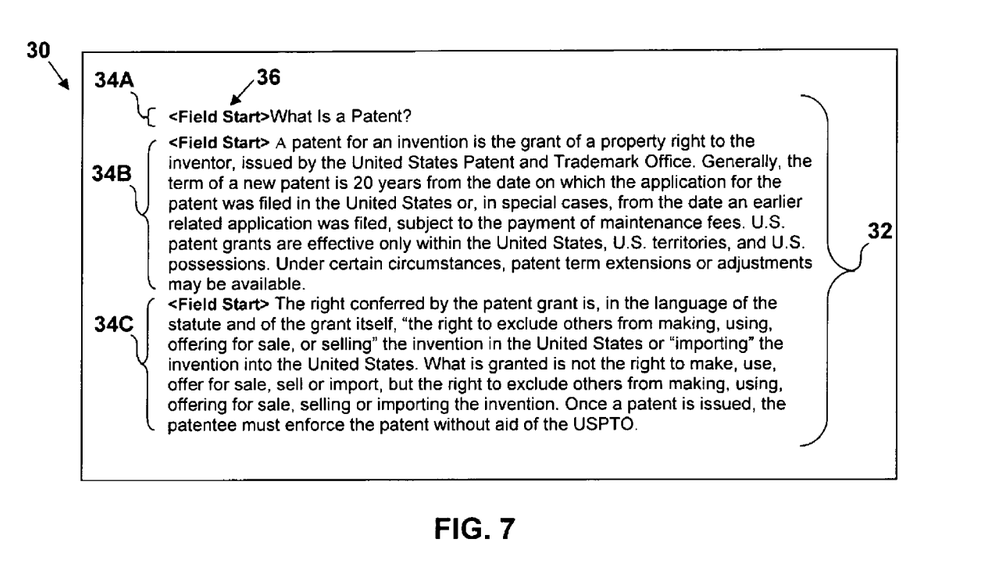
FIG. 7 depicts an illustrative Wiki in editing mode in accordance with an embodiment of the present invention.

FIG. 7 depicts an illustrative Wiki 30 in editing mode in accordance with an embodiment of the present invention. As shown, Wiki 30 comprises a block of text 32 formed by a sequence of virtual fields 34 (e.g., 34A, 34B, 34C), each owned by one user (or one role). In this example, virtual fields 34A and 34C were created/edited by User-1, and are thus owned by User-1, while field 34B was created/edited by User-2, and is thus owned by User-2. The owner of a virtual field 34 is granted access control for that virtual field 34, and thus can specify the ACL(s) for that virtual field 34.

The boundaries of the virtual fields 34A, 34B, and 34C are indicated by delimiters 36 (e.g., <Field Start>). The text between each pair of adjacent delimiters 36 (as well as below the last delimiter 36) comprises a virtual field 34. Access control for each virtual field 34 applies only to the text that occurs in that virtual field 34. When a user inserts a delimiter 36 into the block of text 32 in the Wiki 30, that user becomes the owner of the virtual field 34 thus created. Each delimiter 36 is visible during the editing of the block of text 32, and may optionally be visible during display of the Wiki 30. The delimiters 36 may not be overwritten during editing. Although only a start delimiter 36 is shown as defining a virtual field 34, both start and end delimiters 36 (e.g., <Field Start> and <Field End> could be used.

Figure 8:
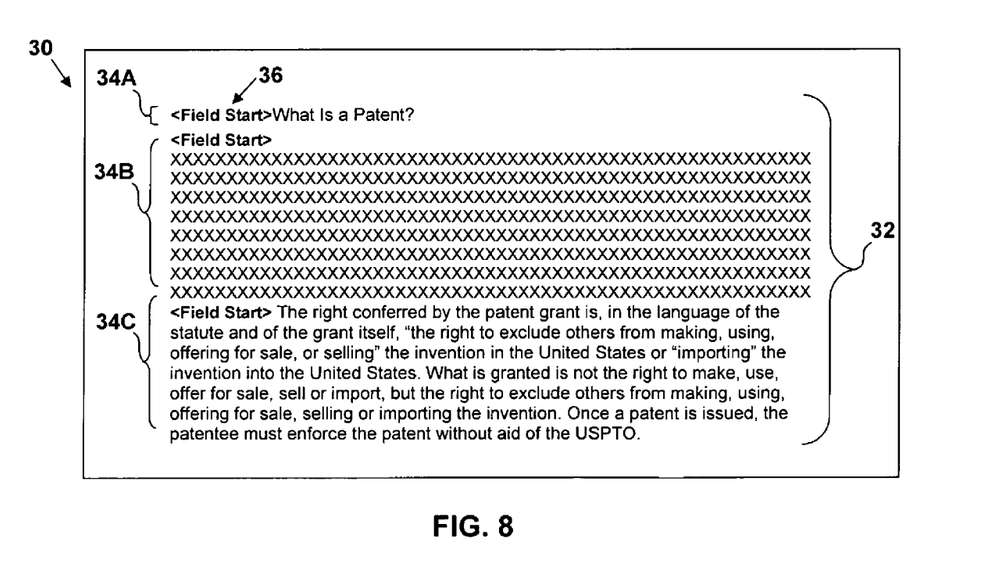
FIG. 8 depicts the Wiki of FIG. 7 in editing mode when accessed by a user who does not have view permission for one of the virtual fields.

During editing of the block of text 32 in Wiki 30, a user can only edit the contents of the virtual field(s) 34 the user owns or for which the user has been given edit permission. By default, the owning user of a virtual field 34 is assumed to have edit and view permissions for that virtual field 34. As shown in FIG. 8, for example, when User-1 is editing virtual field 34A, the other virtual fields 34B and 34C are displayed in sequence. The contents of the fields 34A and 34C are displayed to User-1 since User-1 is the owner of those fields. The content of field 34B, owned by User-2, however, is not displayed to User-1 because User-1 does not have view permission for that field. As such, field 34B can be filled with nonsense characters as shown or blanked out in some manner. If User-1 did have view or view/edit permission for field 34B, then the contents of field 34B would be displayed to User-1.

Figure 9:
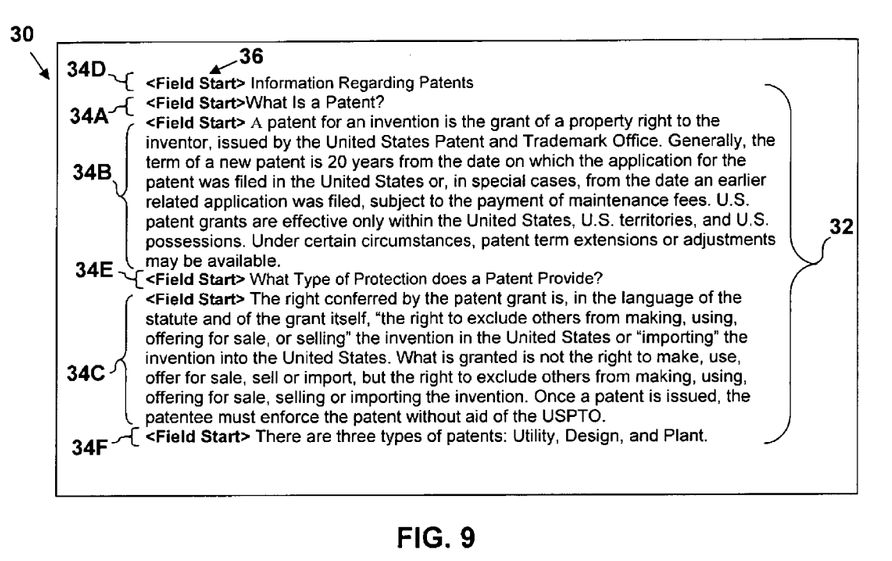
FIG. 9 depicts the Wiki of FIG. 7 in editing mode in which new virtual fields are inserted into the block of text.

A user may insert a new virtual field 34 in the body of text 32. By default, the user is the owner of this new virtual field 34. In one embodiment of the present invention, a user may only insert a new virtual field 34 at the boundary of another virtual field 34 (i.e., at the beginning or end of the body of text 32, or between two other virtual fields 34). Thereafter, the user can edit the new virtual field 34 as desired. An example of this is illustrated in FIG. 9, where User-2 has inserted a new virtual field 34D above existing virtual field 34A, a new virtual field 34E between existing virtual fields 34B and 34C, and a new virtual field 34F below existing virtual field 34C. Fields 34A and 34C, which are owned by User-1, may or may not be visible to User-2, depending on the permissions on those fields set by User-1.

Figure 10:
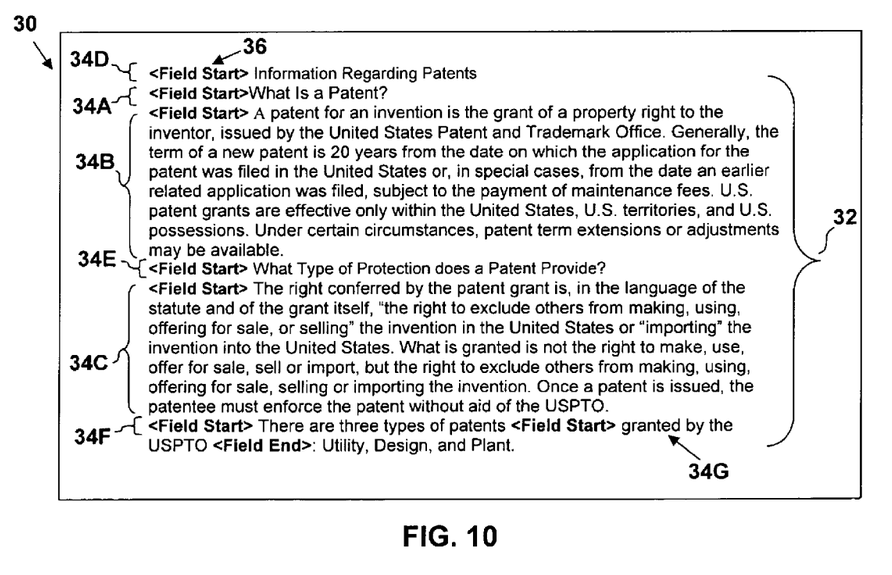
FIG. 10 depicts the Wiki of FIG. 7 in editing mode where a new virtual field is inserted within an existing virtual field.

In another embodiment of the present invention, a user can insert a new virtual field 34 anywhere within any other virtual field 34 (edit permission for the other virtual field 34 may be required). An example of this is shown in FIG. 10, where User-2 has inserted a new virtual field 34G within existing virtual field 34F. The new virtual field 34G can be delineated within virtual field 34F using one or more delimiters 36 (e.g., <Field Start> and <Field End>).

Figure 11:
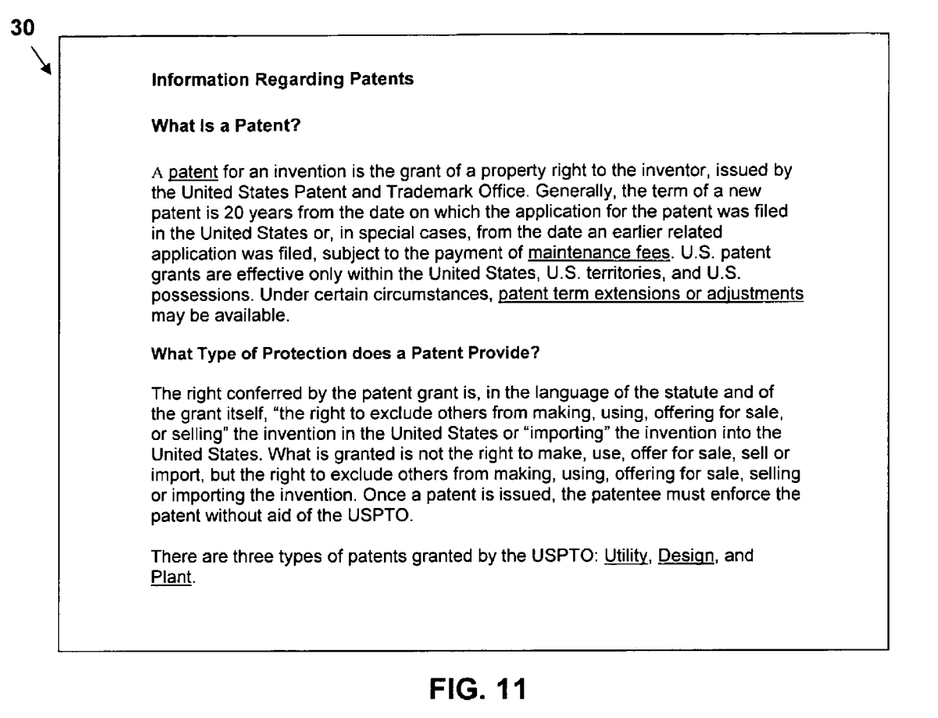
FIG. 11 depicts the Wiki of FIG. 10 is display mode.

During display of the Wiki 30, all of the virtual fields 34 are combined in order, and formatted according to Wiki formatting conventions. An example of how Wiki 30 could look when displayed is depicted in FIG. 11. As shown, the delimiters 36 are invisible during the display of Wiki 30, and there is no additional information about which user edit/owns each virtual field 34. In another embodiment, there is mouse-over information (or similar optional information that may be revealed) regarding the owner of each virtual field 34. In yet another embodiment, the delimiters 34 are visible, and there is mouse-over information (or similar, per above) about the owner of each virtual field 34.

Figure 12:
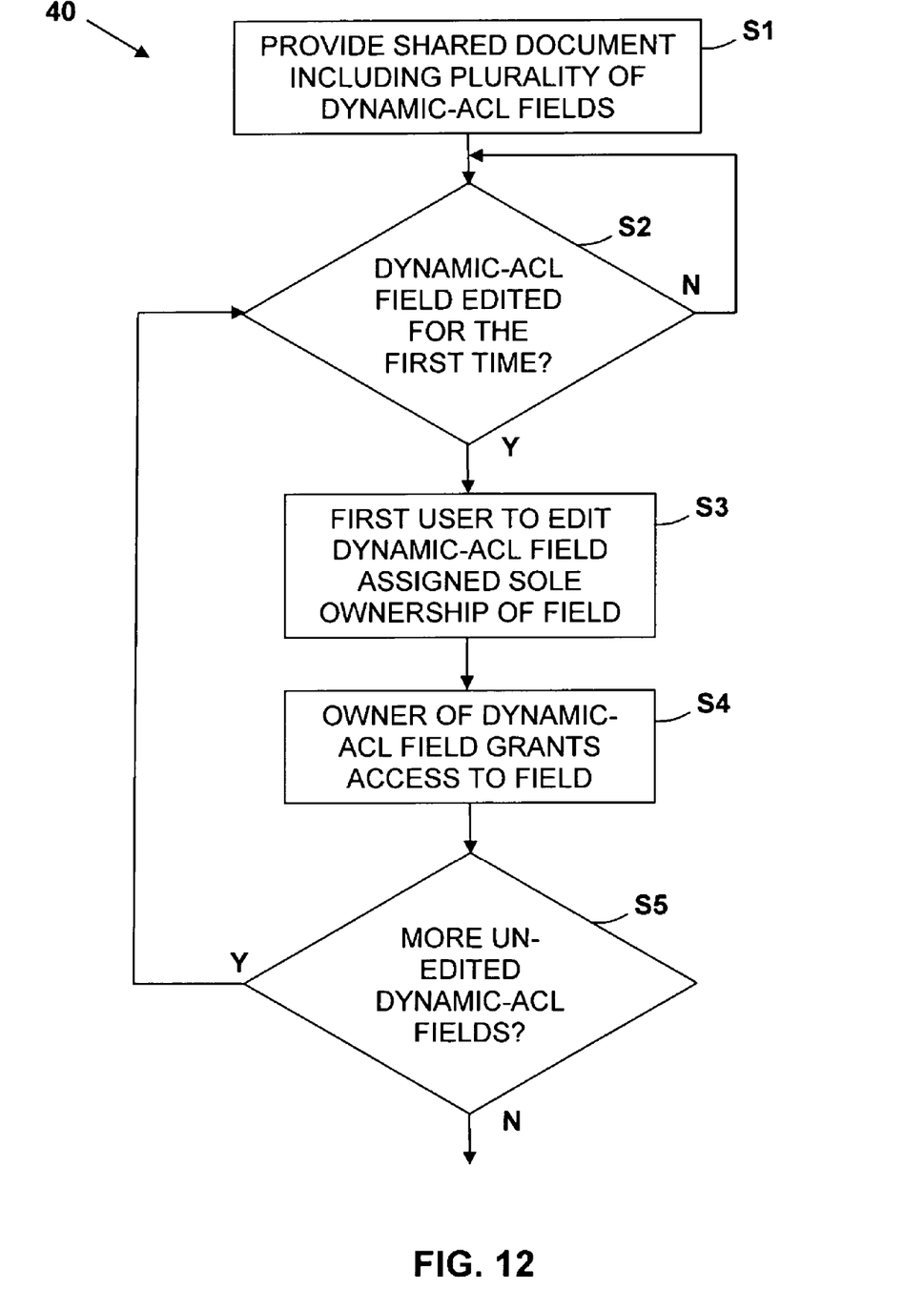
FIG. 12 depicts a flow diagram of a method in accordance with an embodiment of the present invention.

A flow diagram 40 of an algorithm for dynamic field-level access control in shared documents in accordance with an embodiment of the present invention is illustrated in FIG. 12. In step S1, a shared document is provided, wherein the shared document includes a plurality of dynamic-ACL fields. Initially, none of the plurality of dynamic-ACL fields have been edited and are thus not owned by any user. In step S2, a user edits a previously un-edited dynamic-ACL field in the shared document. In response to the editing of the dynamic-ACL field, in step S3, the user is automatically assigned sole ownership of the dynamic-ACL field. In step S4, the owner of the dynamic-ACL field grants access to the dynamic-ACL field as detailed above. This process is repeated for each dynamic-ACL field in the shared document (step S5).

Figure 13:
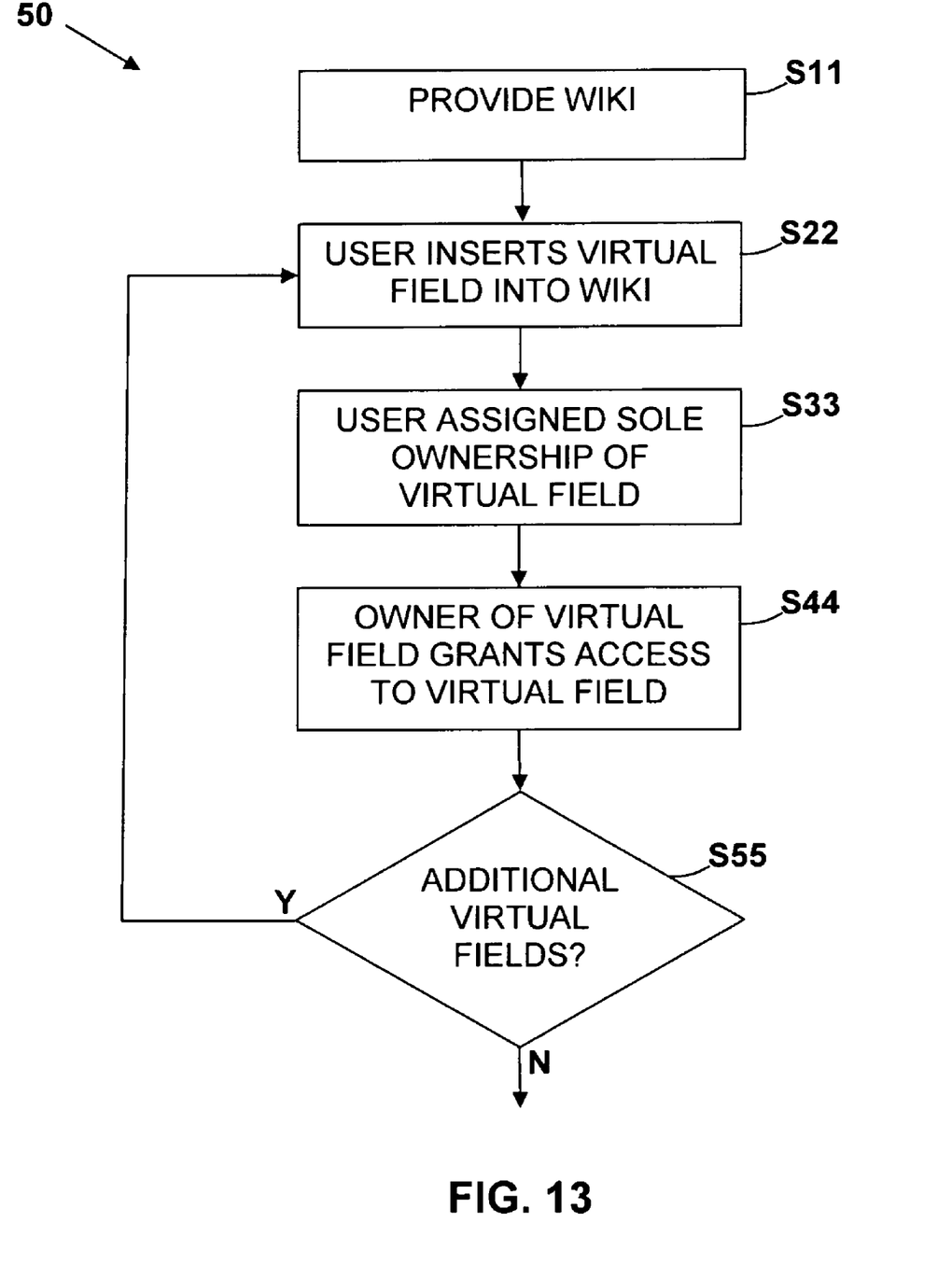
FIG. 13 depicts a flow diagram of a method in accordance with another embodiment of the present invention.

A flow diagram 50 of an algorithm for dynamic field-level access control in a Wiki-type environment is illustrated in FIG. 13. In step S11, a Wiki is provided. The Wiki can be empty or may include an existing block of text, which may or may not include one or more existing virtual fields. In step S22, a user inserts a new virtual field into the Wiki using one or more delimiters. In response, in step S33, the user is assigned sole ownership of the virtual field. In step S44, the owner of virtual field grants access to the virtual field as detailed above. This process is repeated for each new virtual field inserted into the block of text comprising the Wiki (step S55).

Figure 14:
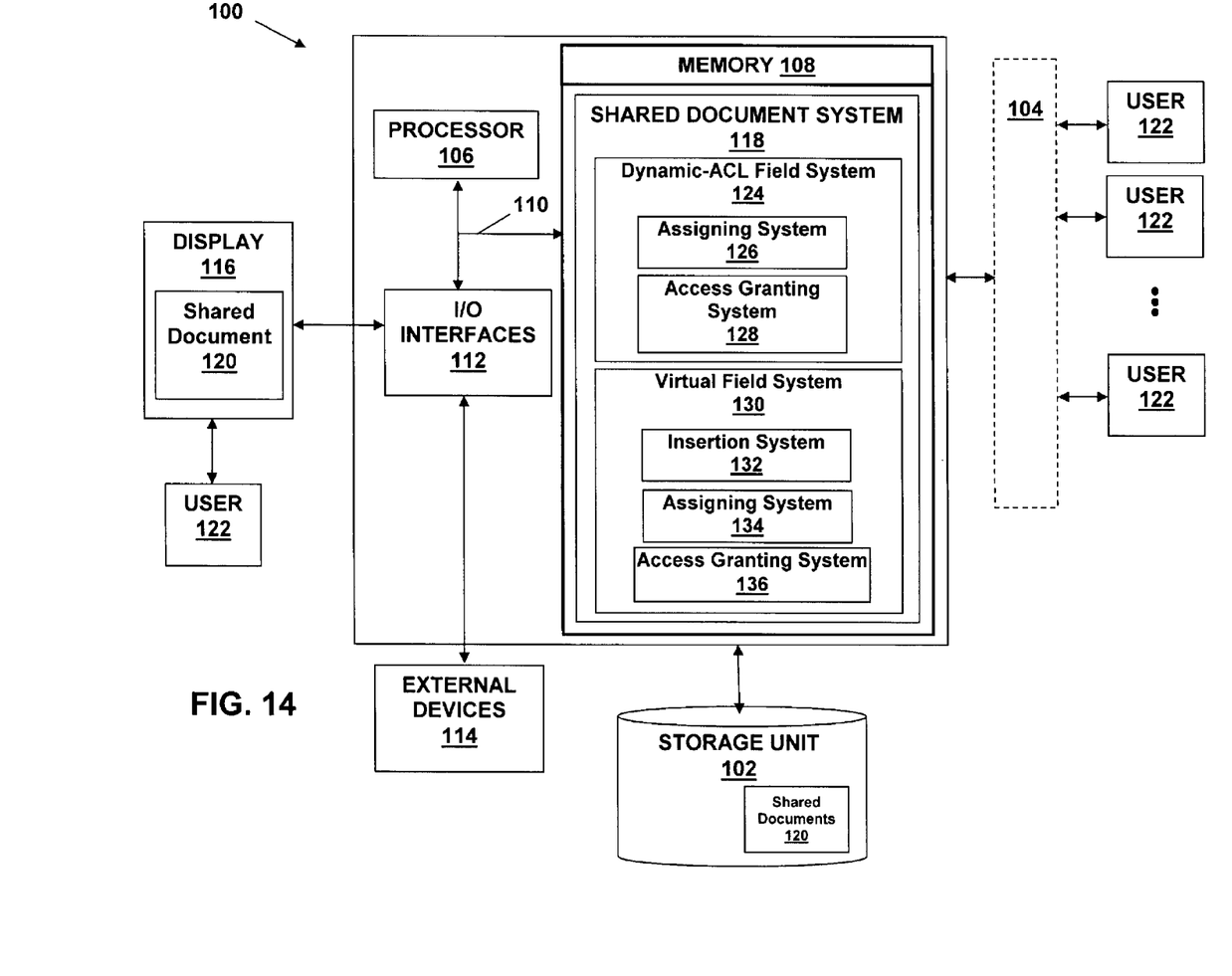
FIG. 14 depicts a computer system for implementing a method in accordance with an embodiment of the present invention.

Referring now to FIG. 14, there is illustrated a computer system 100 for dynamic field-level access control in shared documents in accordance with the present invention. Computer system 100 is intended to represent any type of computerized system capable of implementing the methods of the present invention. For example, computer system 100 may comprise a desktop computer, laptop, workstation, server, PDA, cellular phone, pager, etc.

Shared documents, Wikis, ACLs, dynamic-ACL fields, virtual fields, and other data used in the practice of the present invention can be stored locally to computer system 100, for example, in storage unit 102, and/or may be provided to computer system 100 over a network 104. Storage unit 102 can be any system capable of providing storage for data and information under the present invention. As such, storage unit 102 may reside at a single physical location, comprising one or more types of data storage, or may be distributed across a plurality of physical systems in various forms. In another embodiment, storage unit 102 may be distributed across, for example, a local area network (LAN), wide area network (WAN) or a storage area network (SAN) (not shown).

Network 104 is intended to represent any type of network over which data can be transmitted. For example, network 104 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown in FIG. 14, computer system 100 generally includes a processor 106, memory 108, bus 110, input/output (I/O) interfaces 112 and external devices/resources 114. Processor 106 may comprise a single processing unit, or may be distributed across one or more processing units in one or more locations, e.g., on a client and server. Memory 108 may comprise any known type of data storage and/or transmission media, including magnetic media, optical media, random access memory (RAM), read-only memory (ROM), etc. Moreover, similar to processor 106, memory 108 may reside at a single physical location, comprising one or more types of data storage, or be distributed across a plurality of physical systems in various forms.

I/O interfaces 112 may comprise any system for exchanging information to/from an external source. External devices/resources 114 may comprise any known type of external device, including speakers, a CRT, LED screen, handheld device, keyboard, mouse, voice recognition system, speech output system, printer, monitor/display (e.g., display 116), facsimile, pager, etc.

Bus 110 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Shown in memory 108 is a shared document system 118, which can be any known or later developed system/program capable of providing/editing shared documents 120 (including Wikis), based on input from a plurality of users 122. Users 122 can be local to computer system 100 or can connect to computer system 100 via network 104. Also shown in memory 108 is a dynamic-ACL field system 124. Dynamic-ACL field system 124 includes an assigning system 126 for assigning ownership of a dynamic-ACL field in a shared document to the first user 122 that edits the field, and an access granting system 128 which allows the owner of a dynamic-ACL field to grant access to the field via one or more ACLs.

Memory 108 also includes a virtual field system 130. Virtual field system 130 includes a virtual field insertion system 132 for inserting a virtual field into a Wiki, an assigning system 134 for assigning ownership of an inserted virtual field to the user 122 that inserted the field into the Wiki, and an access granting system 136 which allows the owner of a virtual field to grant access to the field via one or more ACLs.

It should be appreciated that the teachings of the present invention could be offered as a business method on a subscription or fee basis. For example, computer system 100 could be created, maintained, supported, and/or deployed by a service provider that offers the functions described herein for customers. That is, a service provider could be used to provide dynamic field-level access control in shared documents, as describe above. It should also be understood that the present invention can be realized in hardware, software, a or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for dynamic field-level access control in a shared document, comprising:
    providing a field in the shared document, wherein an indication is designated to the field to indicate the field is initially not owned and can be edited by any user, wherein editing includes changing a content of the field, and wherein a user comprises a person;
    assigning sole ownership of the field to a user who first edits the field in response to the user editing the content of the field, wherein the sole ownership of the field is not relinquished after the user edits the field, and wherein the owner of the field controls access to the field using at least one access control list;
    selectively displaying ownership information of the field to at least one other user;
    wherein the owner of the field can specify at least one of the following:
        which users can view the field;
        which users can edit the field;
        whether code associated with the shared document can access the field; and
        whether entities that access the shared document can access the field; and
    in response to a request to view the field by an unauthorized user after the assigning of sole ownership, displaying the field to the unauthorized user using one of a blank, a nonsense character or a phantom character.

2. The method of claim 1, wherein the owner of the field can change access to the field at any time.

3. The method of claim 1, further comprising:
    a user inserting a new field into the shared document; and
    assigning sole ownership of the new field to the user who inserted the new field into the shared document, wherein the owner of the new field controls access to the new field using at least one access control list.

4. The method of claim 1, wherein access to the field cascades to fields in other shared documents.

5. The method of claim 1, wherein the sole ownership of the field further extends permanently.

6. The method of claim 1, wherein the sole ownership of the field is not relinquished after a second user distinct from the user edits the field.

7. A method for deploying an application for dynamic field-level access control in a shared document, comprising:
    providing a computer infrastructure being configured to perform the method of claim 1.

8. A method for dynamic field-level access control in a shared document, comprising:
    providing a field in the shared document, wherein an indication is designated to the field to indicate the field is initially not owned and can be edited by any role, wherein editing includes changing a content of the field, and wherein a role is associated with a plurality of users;
    assigning sole and permanent ownership of the field to a role in response to a user associated with the role first editing a content of the field, wherein the sole ownership of the field is not relinquished after the user edits the field, and wherein the owner of the field controls access to the field using at least one access control list; and selectively displaying ownership information of the field to at least one other role;

wherein the owner of the field can specify at least one of the following:
- which roles can view the field;
- which roles can edit the field;
- whether code associated with the shared document can access the field; and
- whether entities that access the shared document can access the field; and in response to a request to view the field by an unauthorized user after the assigning of sole ownership, displaying the field to the unauthorized user using one of a blank, a nonsense character or a phantom character.

9. The method of claim 8, wherein the sole ownership of the field further extends permanently.

10. The method of claim 8, wherein the sole ownership of the field is not relinquished after a second role distinct from the role edits the field.

11. A system for dynamic field-level access control in a shared document, comprising:

at least one computer system having a processor, the at least one computer system including:
- a system for providing a field in the shared document, wherein an indication is designated to the field to indicate the field is initially not owned and can be edited by any user, wherein editing includes changing a content of the field, and wherein a user comprises a person;
- a system for assigning sole and permanent ownership of the field to a user who first edits the field in response to the user editing the content of the field, wherein the sole ownership of the field is not relinquished after the user edits the field, and wherein the owner of the field controls access to the field using at least one access control list; and
- a system for selectively displaying ownership information of the field to at least one other user;

wherein the owner of the field can specify at least one of the following:
- which users can view the field;
- which users can edit the field;
- whether code associated with the shared document can access the field; and
- whether entities that access the shared document can access the field;

wherein the system for selectively displaying ownership information further performs the following:

in response to a request to view the field by an unauthorized user after the assigning of sole ownership, displaying the field to the unauthorized user using one of a blank, a nonsense character or a phantom character.

12. The system of claim 11, wherein the owner of the field can change access to the field at any time.

13. The system of claim 12, further comprising:

a system for allowing a user to insert a new field into the shared document; and a system for assigning sole ownership of the new field to the user who inserted the new field into the shared document, wherein the owner of the new field controls access to the new field using at least one access control list.

14. The system of claim 13, wherein access to the field cascades to fields in other shared documents.

15. The system of claim 11, wherein the sole ownership of the field further extends permanently.

16. The system of claim 11, wherein the sole ownership of the field is not relinquished after a second user distinct from the user edits the field.

17. A program product stored on a computer-readable storage medium for dynamic field-level access control in a shared document, which when executed comprises:

program code for providing a field in the shared document, wherein an indication is designated to the field to indicate the field is initially not owned and can be edited by any user, wherein editing includes changing a content of the field, and wherein a user comprises a person;

program code for assigning sole and permanent ownership of the field to a user who first edits the field in response to the user editing the content of the field, wherein the sole ownership of the field is not relinquished after the user edits the field, and wherein the owner of the field controls access to the field using at least one access control list;

program code for selectively displaying ownership information of the field to at least one other user;

wherein the owner of the field can specify at least one of the following:
- which users can view the field;
- which users can edit the field;
- whether code associated with the shared document can access the field; and
- whether entities that access the shared document can access the field; and program code for, in response to a request to view the field by an unauthorized user after the assigning of sole ownership, displaying the field to the unauthorized user using one of a blank, a nonsense character or a phantom character.

18. The program product of claim 17, wherein the owner of the field can change access to the field at any time.

19. The program product of claim 18, further comprising:

program code for allowing a user to insert a new field into the shared document; and program code for assigning sole ownership of the new field to the user who inserted the new field into the shared document, wherein the owner of the new field controls access to the new field using at least one access control list.

20. The program product of claim 19, wherein access to the field cascades to fields in other shared documents.

21. The program product of claim 17, wherein the sole ownership of the field further extends permanently.

22. The program product of claim 17, wherein the sole ownership of the field is not relinquished after a second user distinct from the user edits the field.

* * * * *